(12) United States Patent
Chang et al.

(10) Patent No.: US 11,073,664 B2
(45) Date of Patent: Jul. 27, 2021

(54) CABLE BOOT ASSEMBLY FOR RELEASING FIBER OPTIC CONNECTOR FROM A RECEPTACLE

(71) Applicant: Senko Advanced Components. Inc., Marlborough, MA (US)

(72) Inventors: Jimmy Jun-Fu Chang, Worcester, MA (US); Kazuyoshi Takano, Tokyo (JP)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/539,854

(22) Filed: Aug. 13, 2019

(65) Prior Publication Data

US 2020/0049904 A1 Feb. 13, 2020

Related U.S. Application Data

(60) Provisional application No. 62/718,179, filed on Aug. 13, 2018.

(51) Int. Cl.
*G02B 6/38* (2006.01)

(52) U.S. Cl.
CPC ......... *G02B 6/3893* (2013.01); *G02B 6/3881* (2013.01); *G02B 6/3887* (2013.01)

(58) Field of Classification Search
None
See application file for complete search history.

(56) References Cited

U.S. PATENT DOCUMENTS

| 585,194 | A | 6/1897 | Favor |
|---|---|---|---|
| 678,283 | A | 7/1901 | Schaefer |
| 3,721,945 | A | 3/1973 | Hults |
| 4,150,790 | A | 4/1979 | Potter |
| 4,240,695 | A | 12/1980 | Evans |
| 4,327,964 | A | 5/1982 | Haesly |
| 4,478,473 | A | 10/1984 | Frear |
| 4,762,388 | A | 8/1988 | Tanaka |
| 4,764,129 | A | 8/1988 | Jones |
| 4,840,451 | A | 6/1989 | Sampson |
| 4,872,736 | A | 10/1989 | Myers |
| 4,979,792 | A | 12/1990 | Weber |
| 5,026,138 | A | 6/1991 | Boudreau |
| 5,031,981 | A | 7/1991 | Peterson |
| 5,041,025 | A | 8/1991 | Haitmanek |
| 5,073,045 | A | 12/1991 | Abendschein |

(Continued)

FOREIGN PATENT DOCUMENTS

| CA | 2308645 A1 * | 12/2000 | ........... G02B 6/3831 |
|---|---|---|---|
| CN | 2836038 Y | 11/2006 | |

(Continued)

OTHER PUBLICATIONS

Hikosaka et al., Machine Translation of JP 2012-008253 A, Jan. 12, 2012. (Year: 2012).*

(Continued)

*Primary Examiner* — Michelle R Connelly

(57) ABSTRACT

A fiber optic connector with a pair resilient actuators positioned on an outer portion of an upper body portion of a cable boot assembly, when depressed allow a user to remove the cable boot assembly from a housing, rotate, and change polarity of the ferrules located within a front body secured to the cable boot assembly.

7 Claims, 13 Drawing Sheets

(56) References Cited

U.S. PATENT DOCUMENTS

| | | |
|---|---|---|
| D323,143 S | 1/1992 | Ohkura |
| 5,101,463 A | 3/1992 | Cubukciyan |
| 5,146,813 A | 9/1992 | Stanfill, Jr. |
| 5,159,652 A | 10/1992 | Grassin D'Alphonse |
| 5,265,181 A | 11/1993 | Chang |
| 5,289,554 A | 2/1994 | Cubukciyan |
| 5,315,679 A | 5/1994 | Baldwin |
| 5,317,663 A | 5/1994 | Beard |
| 5,321,784 A | 6/1994 | Cubukciyan |
| 5,335,301 A | 8/1994 | Newman |
| 5,348,487 A | 9/1994 | Marazzi |
| 5,418,875 A | 5/1995 | Nakano |
| 5,444,806 A | 8/1995 | de Marchi |
| 5,481,634 A | 1/1996 | Anderson |
| 5,506,922 A | 4/1996 | Grois |
| 5,521,997 A | 5/1996 | Rovenolt |
| 5,570,445 A | 10/1996 | Chou |
| 5,588,079 A | 12/1996 | Tanabe |
| 5,602,951 A | 2/1997 | Shiota |
| 5,684,903 A | 11/1997 | Kyomasu |
| 5,687,268 A | 11/1997 | Stephenson |
| 5,781,681 A | 7/1998 | Manning |
| 5,845,036 A | 12/1998 | De Marchi |
| 5,862,282 A | 1/1999 | Matsuura |
| 5,915,987 A | 6/1999 | Reed |
| 5,930,426 A | 7/1999 | Harting |
| 5,937,130 A | 8/1999 | Amberg |
| 5,953,473 A | 9/1999 | Shimotsu |
| 5,956,444 A | 9/1999 | Duda |
| 5,971,626 A | 10/1999 | Knodell |
| 6,041,155 A | 3/2000 | Anderson |
| 6,049,040 A | 4/2000 | Biles |
| 6,095,862 A | 8/2000 | Doye |
| 6,134,370 A | 10/2000 | Childers |
| 6,178,283 B1 | 1/2001 | Weigel |
| RE37,080 E | 3/2001 | Stephenson |
| 6,206,577 B1 | 3/2001 | Hall, III |
| 6,206,581 B1 | 3/2001 | Driscoll |
| 6,227,717 B1 | 5/2001 | Ott |
| 6,238,104 B1 | 5/2001 | Yamakawa |
| 6,240,228 B1 | 5/2001 | Chen |
| 6,247,849 B1 | 6/2001 | Liu |
| 6,250,817 B1 | 6/2001 | Lampert |
| 6,276,840 B1 | 8/2001 | Weiss |
| 6,318,903 B1 | 11/2001 | Andrews et al. |
| 6,364,537 B1 | 4/2002 | Maynard |
| 6,379,052 B1 * | 4/2002 | de Jong et al. ...... G02B 6/3806 385/59 |
| 6,422,759 B1 | 7/2002 | Kevern |
| 6,450,695 B1 | 9/2002 | Matsumoto |
| 6,461,054 B1 | 10/2002 | Iwase |
| 6,471,412 B1 | 10/2002 | Belenkiy |
| 6,478,472 B1 | 11/2002 | Anderson |
| 6,485,194 B1 | 11/2002 | Shirakawa |
| 6,527,450 B1 | 3/2003 | Miyachi |
| 6,530,696 B1 | 3/2003 | Ueda |
| 6,551,117 B2 | 4/2003 | Poplawski |
| 6,565,262 B2 | 5/2003 | Childers |
| 6,572,276 B1 | 6/2003 | Theis |
| 6,579,014 B2 | 6/2003 | Melton |
| 6,585,194 B1 | 7/2003 | Brushwood |
| 6,634,796 B2 | 10/2003 | de Jong |
| 6,634,801 B1 | 10/2003 | Waldron |
| 6,648,520 B2 | 11/2003 | McDonald |
| 6,668,113 B2 | 12/2003 | Togami |
| 6,682,228 B2 | 1/2004 | Rathnam |
| 6,685,362 B2 | 2/2004 | Burkholder |
| 6,695,486 B1 | 2/2004 | Falkenberg |
| 6,817,272 B2 | 11/2004 | Holland |
| 6,854,894 B1 | 2/2005 | Yunker |
| 6,869,227 B2 | 3/2005 | Del Grosso |
| 6,872,039 B2 | 3/2005 | Baus |
| 6,935,789 B2 | 8/2005 | Gross, III |
| 7,036,993 B2 | 5/2006 | Luther |
| 7,052,186 B1 | 5/2006 | Bates |
| 7,077,576 B2 | 7/2006 | Luther |
| 7,091,421 B2 | 8/2006 | Kukita |
| D533,504 S | 12/2006 | Lee |
| D534,124 S | 12/2006 | Taguchi |
| 7,150,567 B1 | 12/2006 | Luther |
| 7,153,041 B2 | 12/2006 | Mine |
| 7,198,409 B2 | 4/2007 | Smith |
| D543,124 S | 5/2007 | Raatikainen |
| D543,146 S | 5/2007 | Chen |
| 7,258,493 B2 | 8/2007 | Milette |
| 7,264,402 B2 | 9/2007 | Theuerkorn |
| 7,281,859 B2 | 10/2007 | Mudd |
| D558,675 S | 1/2008 | Chien |
| 7,315,682 B1 | 1/2008 | En Lin |
| 7,325,976 B2 | 2/2008 | Gurreri |
| 7,329,137 B2 | 2/2008 | Martin |
| 7,331,718 B2 | 2/2008 | Yazaki |
| 7,354,291 B2 | 4/2008 | Caveney |
| 7,371,082 B2 | 5/2008 | Zimmel |
| 7,387,447 B2 | 6/2008 | Mudd |
| 7,390,203 B2 | 6/2008 | Murano |
| D572,661 S | 7/2008 | En Lin |
| 7,431,604 B2 | 10/2008 | Waters |
| 7,463,803 B2 | 12/2008 | Cody |
| 7,465,180 B2 | 12/2008 | Kusuda |
| 7,473,124 B1 | 1/2009 | Briant |
| 7,510,335 B1 | 3/2009 | Su |
| 7,513,695 B1 | 4/2009 | Lin |
| 7,534,128 B2 | 5/2009 | Caveney et al. |
| 7,540,666 B2 | 6/2009 | Luther |
| 7,588,373 B1 | 9/2009 | Sato |
| 7,591,595 B2 | 9/2009 | Lu |
| 7,594,766 B1 | 9/2009 | Sasser |
| 7,641,398 B2 | 1/2010 | O'Riorden |
| 7,695,199 B2 | 4/2010 | Teo |
| 7,712,970 B1 | 5/2010 | Lee |
| 7,717,625 B2 | 5/2010 | Margolin |
| 7,824,113 B2 | 11/2010 | Wong |
| 7,837,395 B2 | 11/2010 | Lin |
| D641,708 S | 7/2011 | Yamauchi |
| 8,083,450 B1 | 12/2011 | Smith |
| 8,152,385 B2 | 4/2012 | de Jong |
| 8,186,890 B2 | 5/2012 | Lu |
| 8,192,091 B2 | 6/2012 | Hsu |
| 8,202,009 B2 | 6/2012 | Lin |
| 8,221,007 B2 | 7/2012 | Peterhans |
| 8,251,733 B2 | 8/2012 | Wu |
| 8,267,595 B2 | 9/2012 | Lin |
| 8,270,796 B2 | 9/2012 | Nhep |
| 8,408,815 B2 | 4/2013 | Lin |
| 8,414,196 B2 | 4/2013 | Lu |
| 8,465,317 B2 | 6/2013 | Gniadek |
| 8,534,928 B2 | 9/2013 | Cooke |
| 8,550,728 B2 | 10/2013 | Takahashi |
| 8,556,645 B2 | 10/2013 | Crain |
| 8,559,781 B2 | 10/2013 | Childers |
| 8,622,634 B2 | 1/2014 | Arnold |
| 8,636,424 B2 | 1/2014 | Kuffel |
| 8,651,749 B2 | 2/2014 | Dainese Júnior |
| 8,676,022 B2 | 3/2014 | Jones |
| 8,678,670 B2 | 3/2014 | Takahashi |
| 8,727,638 B2 | 5/2014 | Lee |
| 8,757,894 B2 | 6/2014 | Katoh |
| 8,764,308 B2 | 7/2014 | Irwin |
| 8,770,863 B2 | 7/2014 | Cooke |
| 8,869,661 B2 | 10/2014 | Opstad |
| 9,052,474 B2 | 6/2015 | Jiang |
| 9,063,296 B2 | 6/2015 | Dong |
| 9,250,402 B2 | 2/2016 | Ishii |
| 9,310,569 B2 | 4/2016 | Lee |
| 9,366,829 B2 | 6/2016 | Czosnowski |
| 9,411,110 B2 | 8/2016 | Barnette, Jr. |
| 9,448,370 B2 | 9/2016 | Xue |
| 9,465,172 B2 | 10/2016 | Shih |
| 9,494,744 B2 | 11/2016 | de Jong |
| 9,548,557 B2 | 1/2017 | Liu |
| 9,551,842 B2 | 1/2017 | Theuerkorn |
| 9,557,495 B2 | 1/2017 | Raven |
| 9,568,686 B2 | 2/2017 | Fewkes |

(56) References Cited

U.S. PATENT DOCUMENTS

| | | |
|---|---|---|
| 9,581,768 B1 | 2/2017 | Baca |
| 9,599,778 B2 | 3/2017 | Wong |
| 9,658,409 B2 | 5/2017 | Gniadek |
| 9,684,130 B2 | 6/2017 | Veatch |
| 9,684,313 B2 | 6/2017 | Chajec |
| 9,709,753 B1 | 7/2017 | Chang |
| 9,778,425 B2 | 10/2017 | Nguyen |
| 9,829,645 B2 | 11/2017 | Good |
| 9,829,653 B1 | 11/2017 | Nishiguchi |
| 9,869,825 B2 | 1/2018 | Bailey |
| 9,880,361 B2 | 1/2018 | Childers |
| 9,946,035 B2 | 4/2018 | Gustafson |
| 9,989,711 B2 | 6/2018 | Ott |
| 10,031,296 B2 | 7/2018 | Good |
| 10,067,301 B2 | 9/2018 | Murray |
| 10,107,972 B1 | 10/2018 | Gniadek |
| 10,114,180 B2 | 10/2018 | Suzic |
| 10,146,011 B2 | 12/2018 | Nhep |
| 2002/0168148 A1 | 11/2002 | Gilliland |
| 2002/0191919 A1 | 12/2002 | Nolan |
| 2003/0053787 A1 | 3/2003 | Lee |
| 2003/0063862 A1 | 4/2003 | Fillion |
| 2003/0157825 A1 | 8/2003 | Kane |
| 2004/0052473 A1 | 3/2004 | Seo |
| 2004/0109646 A1 | 6/2004 | Anderson |
| 2004/0136657 A1 | 7/2004 | Ngo |
| 2004/0141693 A1 | 7/2004 | Szilagyi |
| 2004/0161958 A1 | 8/2004 | Togami |
| 2004/0234209 A1 | 11/2004 | Cox |
| 2004/0247252 A1 | 12/2004 | Ehrenreich |
| 2005/0036744 A1 | 2/2005 | Caveney et al. |
| 2005/0111796 A1 | 5/2005 | Matasek |
| 2006/0013539 A1 | 1/2006 | Thaler |
| 2006/0076061 A1 | 4/2006 | Bush |
| 2006/0089049 A1 | 4/2006 | Sedor |
| 2006/0127025 A1 | 6/2006 | Haberman |
| 2006/0153503 A1 | 7/2006 | Suzuki et al. |
| 2006/0160429 A1 | 7/2006 | Dawiedczyk |
| 2006/0193562 A1 | 8/2006 | Theuerkorn |
| 2006/0274411 A1 | 12/2006 | Yamauchi |
| 2007/0025665 A1 | 2/2007 | Dean |
| 2007/0028409 A1 | 2/2007 | Yamada |
| 2007/0079854 A1 | 4/2007 | You |
| 2007/0098329 A1 | 5/2007 | Shimoji |
| 2007/0149028 A1 | 6/2007 | Yu |
| 2007/0149062 A1 | 6/2007 | Long |
| 2007/0230874 A1 | 10/2007 | Lin |
| 2007/0232115 A1 | 10/2007 | Burke |
| 2007/0243749 A1 | 10/2007 | Wu |
| 2008/0008430 A1 | 1/2008 | Kewitsch |
| 2008/0044137 A1 | 2/2008 | Luther |
| 2008/0056647 A1 | 3/2008 | Margolin |
| 2008/0064334 A1 | 3/2008 | Hamadi |
| 2008/0175547 A1* | 7/2008 | Wang .............. G02B 6/4292 385/92 |
| 2008/0226237 A1 | 9/2008 | O'Riorden |
| 2009/0022457 A1 | 1/2009 | de Jong |
| 2009/0028507 A1 | 1/2009 | Jones |
| 2009/0047818 A1 | 2/2009 | Irwin |
| 2009/0176401 A1 | 7/2009 | Gu |
| 2009/0196555 A1 | 8/2009 | Lin |
| 2009/0214162 A1 | 8/2009 | O'Riorden |
| 2009/0290938 A1 | 11/2009 | Asaoka |
| 2010/0054668 A1 | 3/2010 | Nelson |
| 2010/0061069 A1 | 3/2010 | Cole |
| 2010/0092136 A1 | 4/2010 | Nhep |
| 2010/0220961 A1* | 9/2010 | de Jong ............ G02B 6/3879 385/77 |
| 2010/0247041 A1 | 9/2010 | Szilagyi |
| 2010/0284656 A1 | 11/2010 | Morra |
| 2011/0044588 A1 | 2/2011 | Larson |
| 2011/0058773 A1 | 3/2011 | Peterhans et al. |
| 2011/0131801 A1 | 6/2011 | Nelson |
| 2011/0155810 A1 | 6/2011 | Taniguchi |
| 2011/0177710 A1 | 7/2011 | Tobey |
| 2011/0239220 A1 | 9/2011 | Gibson |
| 2012/0155810 A1 | 6/2012 | Nakagawa |
| 2012/0189260 A1 | 7/2012 | Kowalczyk |
| 2012/0237177 A1 | 9/2012 | Minota |
| 2012/0269485 A1 | 10/2012 | Haley |
| 2012/0301080 A1 | 11/2012 | Gniadek |
| 2012/0308183 A1 | 12/2012 | Irwin et al. |
| 2012/0328248 A1 | 12/2012 | Larson et al. |
| 2013/0019423 A1 | 1/2013 | Srutkowski |
| 2013/0071067 A1 | 3/2013 | Lin |
| 2013/0094816 A1 | 4/2013 | Lin |
| 2013/0101258 A1 | 4/2013 | Hikosaka et al. |
| 2013/0121653 A1 | 5/2013 | Shitama |
| 2013/0170797 A1 | 7/2013 | Ott |
| 2013/0183012 A1 | 7/2013 | Cabanne Lopez |
| 2013/0216185 A1 | 8/2013 | Klavuhn |
| 2013/0308915 A1 | 11/2013 | Buff |
| 2014/0016901 A1 | 1/2014 | Lambourn |
| 2014/0050446 A1 | 2/2014 | Chang |
| 2014/0056562 A1 | 2/2014 | Limbert |
| 2014/0133808 A1 | 5/2014 | Hill |
| 2014/0169727 A1 | 6/2014 | Veatch |
| 2014/0219621 A1 | 8/2014 | Barnette, Jr. |
| 2014/0226946 A1 | 8/2014 | Cooke |
| 2014/0241644 A1 | 8/2014 | Kang |
| 2014/0241678 A1 | 8/2014 | Bringuier |
| 2014/0241688 A1 | 8/2014 | Isenhour |
| 2014/0334780 A1 | 11/2014 | Nguyen |
| 2014/0348477 A1 | 11/2014 | Chang |
| 2015/0003788 A1 | 1/2015 | Chen |
| 2015/0111417 A1 | 4/2015 | Vanderwoud |
| 2015/0177463 A1 | 6/2015 | Lee |
| 2015/0198766 A1 | 7/2015 | Takahashi |
| 2015/0212282 A1 | 7/2015 | Lin |
| 2015/0241644 A1 | 8/2015 | Lee |
| 2015/0301294 A1 | 10/2015 | Chang |
| 2015/0331201 A1 | 11/2015 | Takano |
| 2015/0355417 A1 | 12/2015 | Takano |
| 2015/0370021 A1 | 12/2015 | Chan |
| 2016/0131849 A1 | 5/2016 | Takano |
| 2016/0139343 A1 | 5/2016 | Dean, Jr. |
| 2016/0161681 A1 | 6/2016 | Banal, Jr. |
| 2016/0172852 A1 | 6/2016 | Tamura |
| 2016/0231512 A1 | 8/2016 | Seki |
| 2016/0259135 A1 | 9/2016 | Gniadek et al. |
| 2016/0266326 A1 | 9/2016 | Gniadek |
| 2016/0320572 A1 | 11/2016 | Gniadek |
| 2016/0349458 A1 | 12/2016 | Murray et al. |
| 2016/0370545 A1 | 12/2016 | Jiang |
| 2017/0003458 A1 | 1/2017 | Gniadek |
| 2017/0205587 A1 | 7/2017 | Chang |
| 2017/0205590 A1 | 7/2017 | Bailey |
| 2017/0205591 A1 | 7/2017 | Takano |
| 2017/0212313 A1 | 7/2017 | Elenabaas et al. |
| 2017/0212316 A1 | 7/2017 | Takano |
| 2017/0254961 A1 | 9/2017 | Kamada |
| 2017/0276275 A1 | 9/2017 | Beemer |
| 2017/0276887 A1 | 9/2017 | Allen |
| 2017/0343740 A1 | 11/2017 | Nguyen |
| 2018/0128988 A1 | 5/2018 | Chang et al. |
| 2018/0156988 A1 | 6/2018 | Gniadek |
| 2018/0172923 A1 | 6/2018 | Bauco |
| 2018/0252872 A1 | 9/2018 | Chen |
| 2018/0341069 A1 | 11/2018 | Takano |
| 2019/0204513 A1 | 7/2019 | Davidson |

FOREIGN PATENT DOCUMENTS

| | | |
|---|---|---|
| CN | 201383588 Y | 1/2010 |
| DE | 19507669 C2 | 10/1998 |
| DE | 202006011910 U1 | 4/2007 |
| DE | 102006019335 A1 | 10/2007 |
| EP | 1211537 A3 | 6/2002 |
| EP | 1245980 B1 | 6/2006 |
| EP | 1566674 B1 | 5/2009 |
| GB | 2111240 B | 9/1985 |
| JP | 2000089059 A | 3/2000 |
| JP | 03752331 B2 | 3/2006 |
| JP | 2009229545 A | 10/2009 |

(56) References Cited

FOREIGN PATENT DOCUMENTS

| | | | | |
|---|---|---|---|---|
| JP | 2009276493 A | | 11/2009 | |
| JP | 04377820 B2 | | 12/2009 | |
| JP | 2012008253 A | * | 1/2012 | ............... G02B 6/36 |
| KR | 200905382 U | | 6/2009 | |
| KR | 1371686 B1 | | 3/2014 | |
| TW | 200821653 A | | 5/2008 | |
| WO | WO2001019904 A1 | | 3/2001 | |
| WO | WO2001079904 A3 | | 3/2002 | |
| WO | WO2004027485 A1 | | 4/2004 | |
| WO | WO2006007120 A1 | | 1/2006 | |
| WO | WO2010024851 A3 | | 6/2010 | |
| WO | WO2012136702 A1 | | 10/2012 | |
| WO | WO2015103783 A1 | | 7/2015 | |
| WO | WO2016019993 A1 | | 2/2016 | |
| WO | WO2019126333 A1 | | 6/2019 | |

OTHER PUBLICATIONS

Fiber Optic Connectors and Assemblies Catalog, 2009, Huber & Suhner Fiber Optics, Herisau, Switzerland.
Fiber Optic Interconnect Solutions, Tactical Fiber Optic Connector Cables and Termini, 2006, Glenair, Inc., Glendale, California.
Fiber Optic Products Catalog, Nov. 2007, Tyco Electronics Corporation, Harrisburg, Pennsylvania.
Final Office Action, U.S. Appl. No. 16/035,691, dated Feb. 11, 2019, pp. 8.
Non-Final Office Action, U.S. Appl. No. 16/035,695, dated Sep. 28, 2018, pp. 7.
International Search Report and Written Opinion for Application No. PCT/US2018/62406 dated Mar. 18, 2019, 12, pages, United States.
International Search Report and Written Opinion for Application No. PCT/US2019/40700 dated Sep. 27, 2019, 12, pages, United States.
International Search Report and Written Opinion for Application No. PCT/US2019/50895 dated Jan. 6, 2020, 12, pages, United States.
International Search Report and Written Opinion for Application No. PCT/US2019/50909 dated Dec. 17, 2019, 11, pages, United States.
International Search Report and Written Opinion for Application No. PCT/US2019/56564 dated Jan. 14, 2020, 14, pages, United States.
International Search Report and Written Opinion, Application No. PCT/US2018/056133, dated Jan. 1, 2019, pp. 7.
International Search Report and Written Opinion, Application No. PCT/US/2018/042202, pp. 17, dated Dec. 7, 2018.
International Search Report and Written Opinion, Application No. PCT/US2018/62405, dated Apr. 3, 2019, pp. 17.
International Search Report and Written Opinion, Application No. PCT/US19/24718, dated Jun. 26, 2019, pp. 7.
International Search Report and Written opinion for Application No. PCT/US2019/013861, dated Apr. 8, 2019, 14 pages.
International Search Report and Written Opinion, Application No. PCT/US19/46397, dated Nov. 12, 2019, pp. 6.
International Search Report and Written Opinion, Application No. PCT/US18/62406, dated Mar. 18, 2019, pp. 11.

* cited by examiner

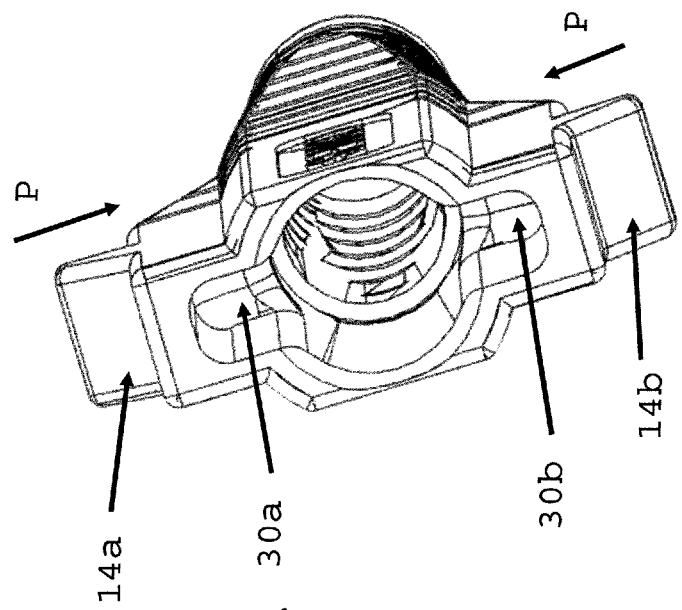
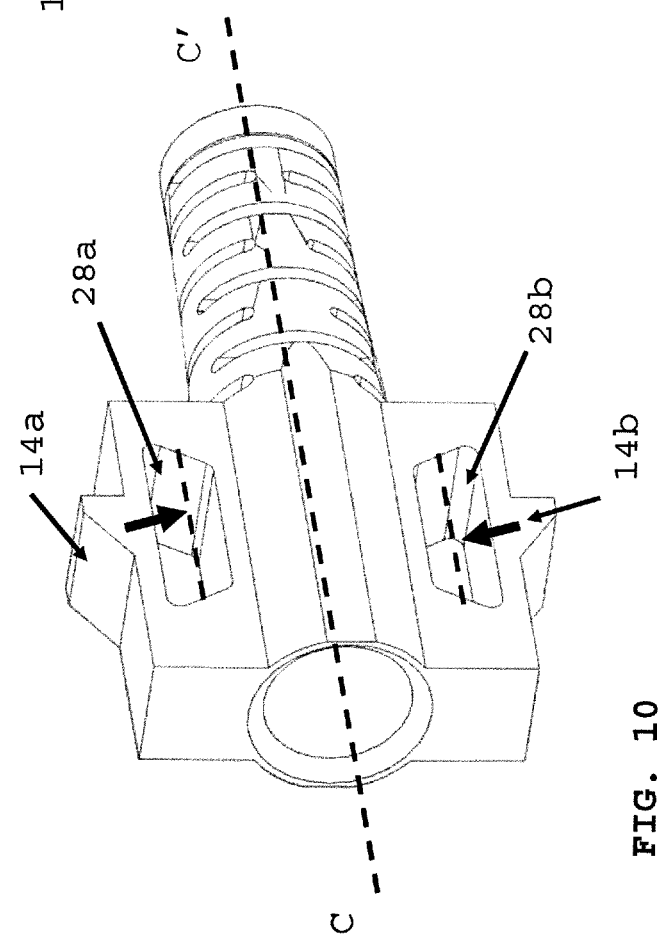
FIG. 11
FIG. 10

CABLE BOOT ASSEMBLY FOR RELEASING FIBER OPTIC CONNECTOR FROM A RECEPTACLE

CROSS REFERENCE TO RELATED APPLICATIONS

This application claims priority to U.S. Patent Application 62/718,179 filed Aug. 13, 2018, which is fully incorporated by reference into the present application.

FIELD OF THE INVENTION

The present disclosure relates generally to fiber optic connectors, and specifically to optical fiber connector having an actuator or release integrated with an outer housing of connector to release connector from a receptacle.

BACKGROUND

The prevalence of the Internet has led to unprecedented growth in communication networks. Consumer demand for service and increased competition has caused network providers to continuously find ways to improve quality of service while reducing cost.

As connectors reduce in size, there needs to be an easy and efficient way to remove a connector from a receptacle. A receptacle can be located in adapter or transceiver housing.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connects, still exists. For example, manufacturers of connectors and adapters are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment. For example, one current footprint is known as the small form-factor pluggable transceiver footprint (SFP). This footprint currently accommodates two LC-type ferrule optical connections. However, it may be desirable to accommodate four optical connections (two duplex connections of transmit/receive) within the same footprint. Another current footprint is the quad small form-factor pluggable (QSFP) transceiver footprint. This footprint currently accommodates four LC-type ferrule optical connections. However, it may be desirable to accommodate eight optical connections of LC-type ferrules (four duplex connections of transmit/receive) within the same footprint.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

The reliability of communication infrastructure depends on secure connections between components, such as cable segments, network equipment, and communication devices. Such connections are continually exposed to dust, dirt, moisture, and/or other contaminants that may infiltrate the connections and degrade performance or even sever the connection between components.

Fiber is typically glass. The glass has an outer jacket, inner strength or reinforcing fibers and a covering. These components are stripped and pulled back. The glass fiber is cleaved, inserted into a ferrule assembly and polished. The glass fiber is polished at a proximal end of the connector. Ferrule assembly is inserted into a plug frame or connector housing and secured therein. The distal end of the fiber cable is secured with a crimp ring and a crimp boot.

SUMMARY OF INVENTION

The invention discloses a cable boot assembly formed of unitary body portion or an upper body portion and a lower body portion. The upper body portion has at least one protruding actuator formed on the outer surface of the upper body portion. The actuator and body portions are formed from a flexible plastic. In use a user can depress the actuator inward and collapse it. Beneath the actuator near or substantial near the actuator is a cavity. The cavity receives the depressed actuator. This allows a user to depress the actuator beneath the receptacle housing, and when a user is pulling distally on the cable boot assembly nearer the lower body portion, a connector can be removed from the receptacle. Likewise, a user can push on the lower body portion or push on a structure that makes up the cable boot assembly. With the connector ferrules faced in a proximal direction and the cable end of the cable boot assembly faced in a distal direction, pushing on the cable boot assembly that actuator or actuators are deformed as described above. Once the cable boot assembly is pushed forward a distance that allows the ferrules to protrude from the receptacle, the compression force on the actuators is released, and the actuator or actuators are accepting into cut-outs formed in the receptacle. An actuator accepted in the cut-out secures the connector within the receptacle under released.

To release a user pushes down on the one or more actuators formed from the upper body portion and pulls on the cable boot assembly in the distal direction. Since the actuators are flexible, the actuator structure will collapse into a cavity formed in the upper body portion while the cable boot assembly is being released from the receptacle.

BRIEF DESCRIPTION OF THE DRAWINGS

FIG. 10 is a perspective view of FIG. 4;

FIG. 11 is a perspective view of FIG. 9;

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

An adapter is a receptacle device with one or more openings or ports configured to accept a connector. An adapter further comprises a housing, and one or more locking mechanism external or internal to the housing. An internal lock may secure a connector within an opening, and an external lock may secure adapter assembly, the latter including connectors, to a panel using a locking nut. A connector is inserted and secured at either end of adapter, for example, a ferrule connector (FC), a fiber distributed data interface (FDDI) connector, an LC connector, a mechanical transfer (MT) connector, a square connector (SC) connector, an SC duplex connector, or a straight tip (ST) connector. The connector may generally be defined by a connector housing body, an external latch or recess to secure said connector into adapter opening and one or more ferrules having optic fibers therein. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

A connector typically has an outer wall with a first and second end that are open to accept a cable assembly at the second end and a first end that can accept an adapter.

Figure 1:
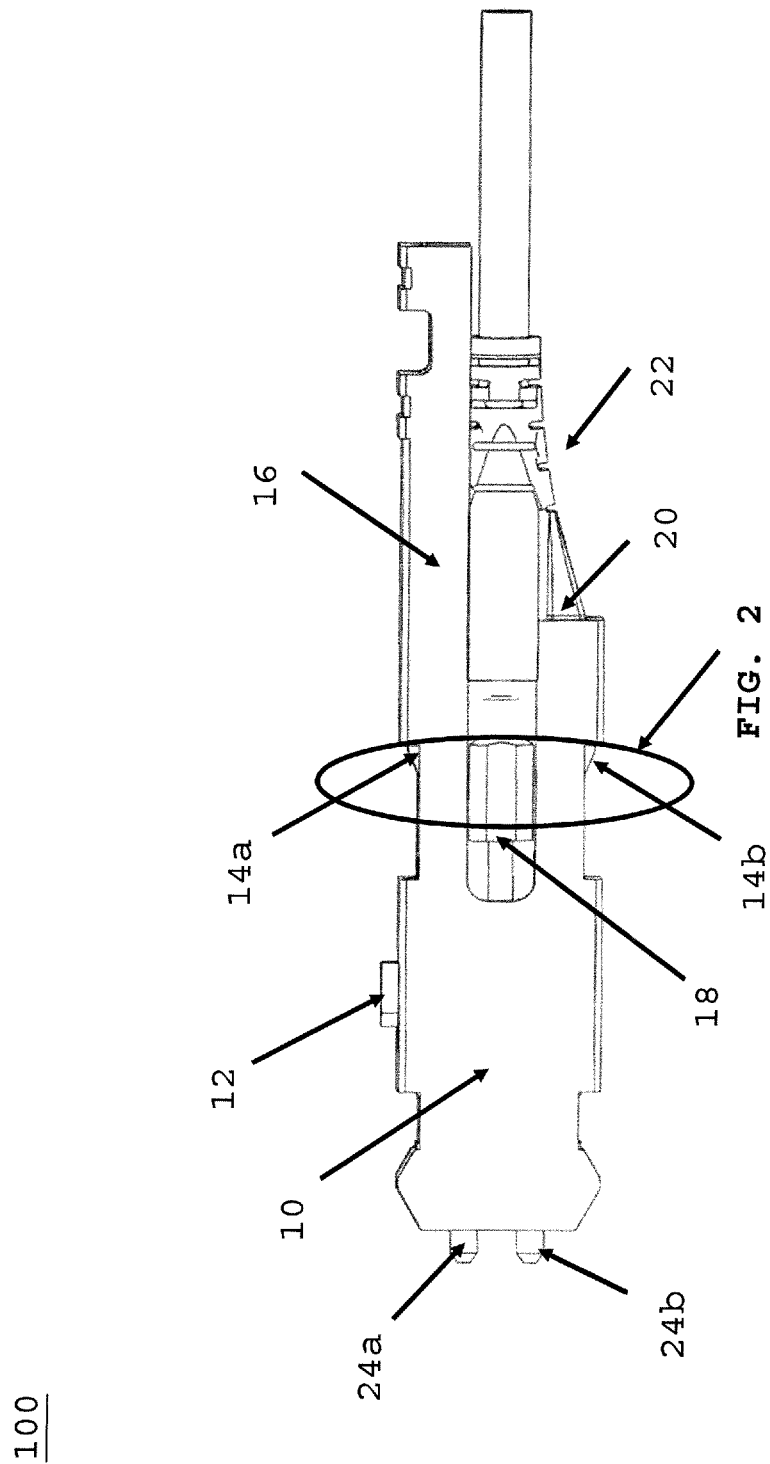
FIG. 1 is perspective view of fiber optic connector with a push/pull boot release actuator.
Figure 6:
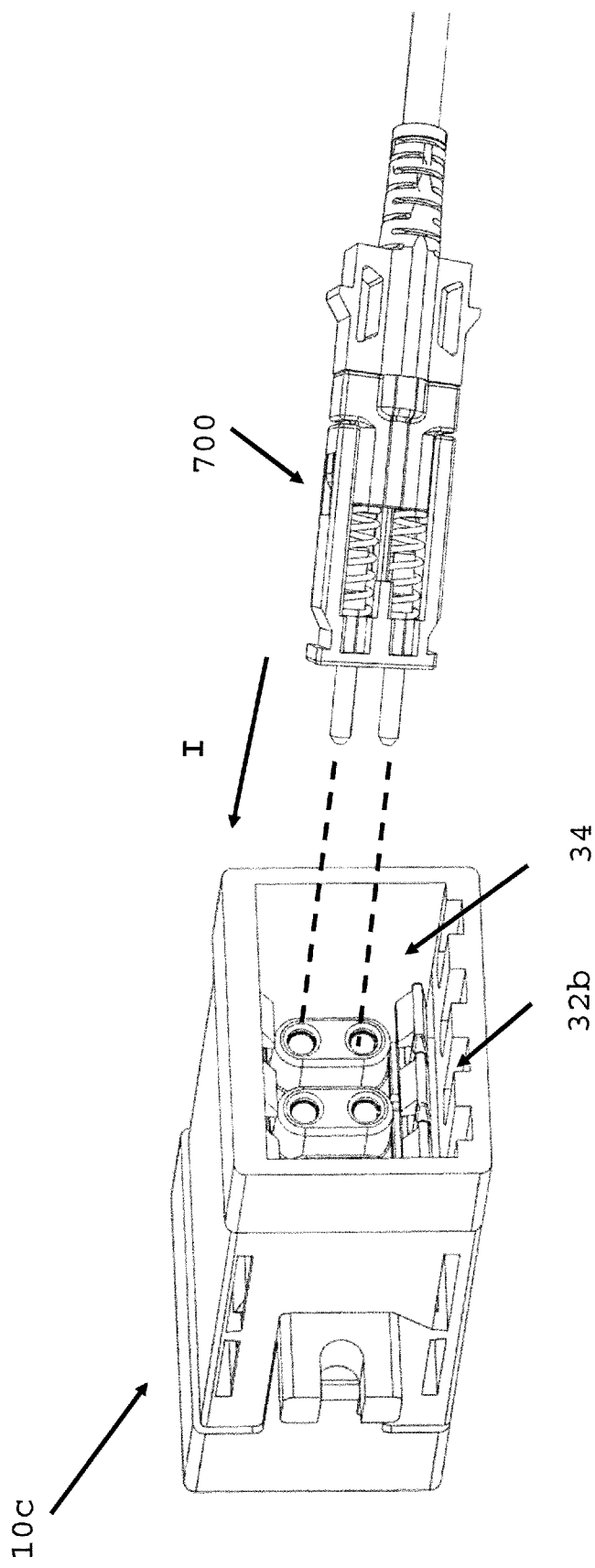
FIG. 6 is an exploded view of inserting connector of FIG. 5 into a receptacle.

FIG. 1 depicts a fiber optic connector 100 with receptacle 10 or connector outer housing having alignment key 12 to ensure connector 100 is accepted without being misaligned within receptacle 34 (refer to FIG. 6) of receptacle 10c or adapter. To remove connector 100 from receptacle opening 34, a user would depress push/pull cable boot release actuator tabs (14a, 14b) and pull distally. Protrusion 20 helps prevent cable boot 22 from being separated from distal end of connector. A user may depress actuator (14a, 14b) or a tool may be used to depress push/pull cable boot assembly releases (14a, 14b). The user can then pull on pull/push tab 16 fixed to outer housing 10 to remove connector from receptacle 10 or connector housing 10. FIG. 6 depicts removing connector 700 from a multi-port receptacle 34. Connector 100 further comprise a pair of ferrules (24a, 24b) with an optical fiber therein that transmits or receives the optical signal.

Figure 2:
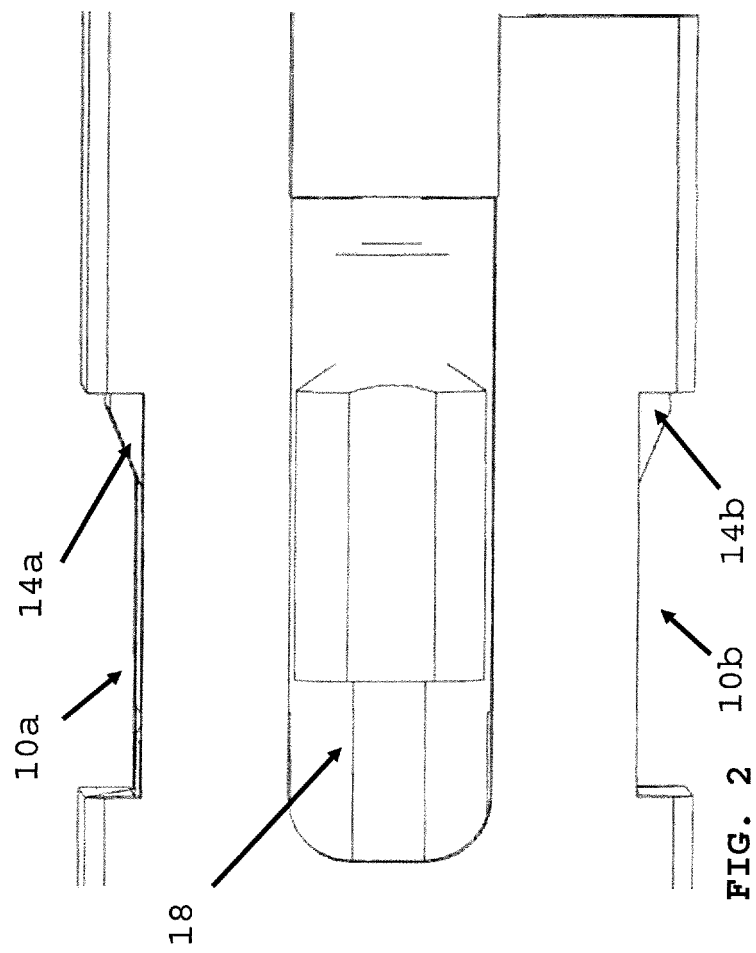
FIG. 2 is a zoomed view of FIG. 1 push/pull boot release actuator.
Figure 3:
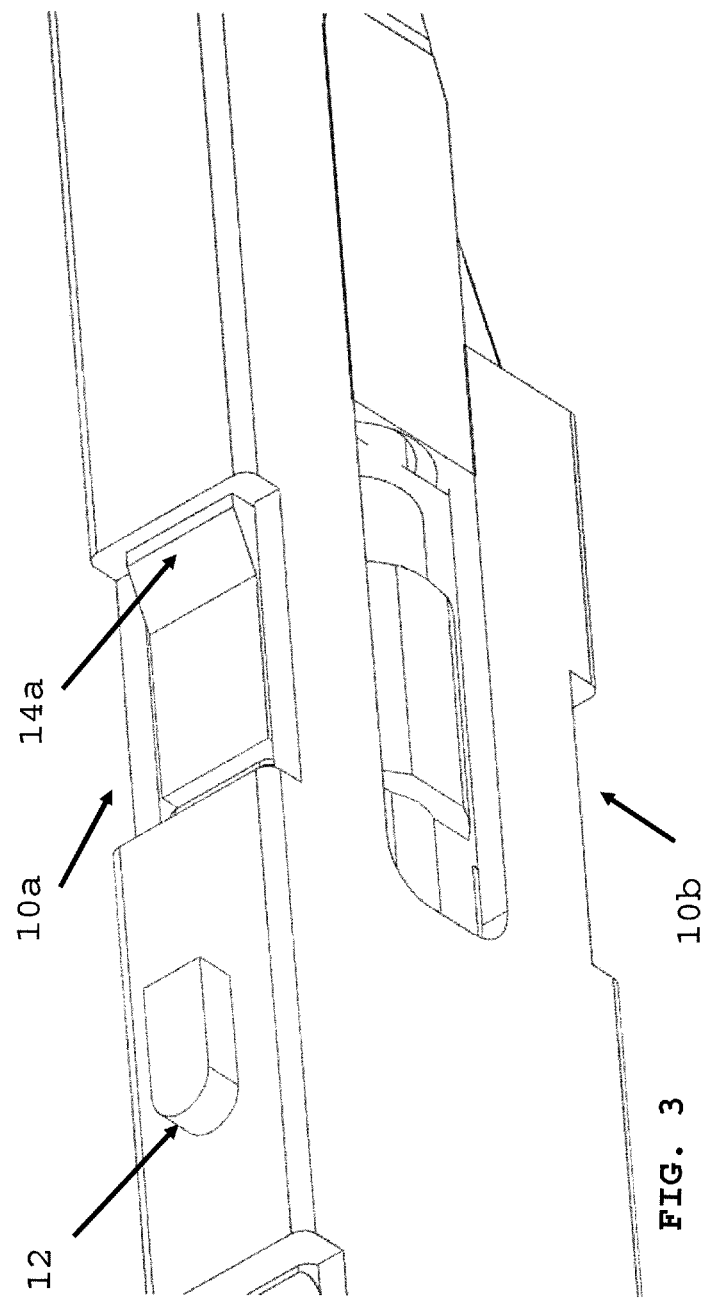
FIG. 3 is a top perspective view of FIG. 1 push/pull boot actuator.

FIG. 2 is an exploded view of push/pull boot release actuators (14a, 14b). A push/pull boot actuator point is located on opposing sides, and one or both is depressed to release connector from receptacle opening. FIG. 3 depicts a top side view zoomed in on push/pull boot release actuator 14a and alignment key 12. Receptacle cut-outs (10a, 10b) secure actuators within receptacle or connector housing 10, and the cut-outs allow access by a user to depress the actuators to allow remove of cable boot assembly 22 from receptacle or connector housing 10 to affect a polarity change of the connector as described below.

Figure 4:
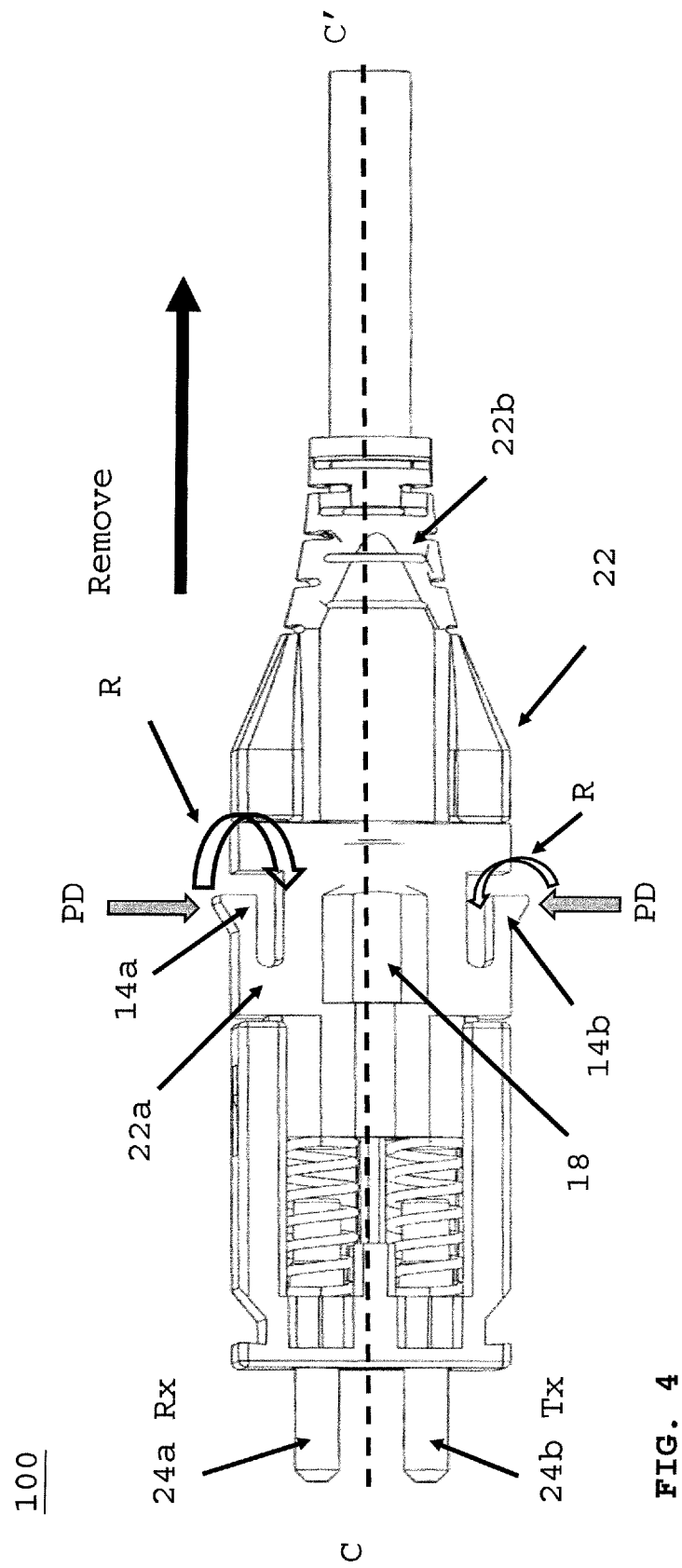
FIG. 4 is a perspective view of FIG. 1 without a receptacle.
Figure 5:
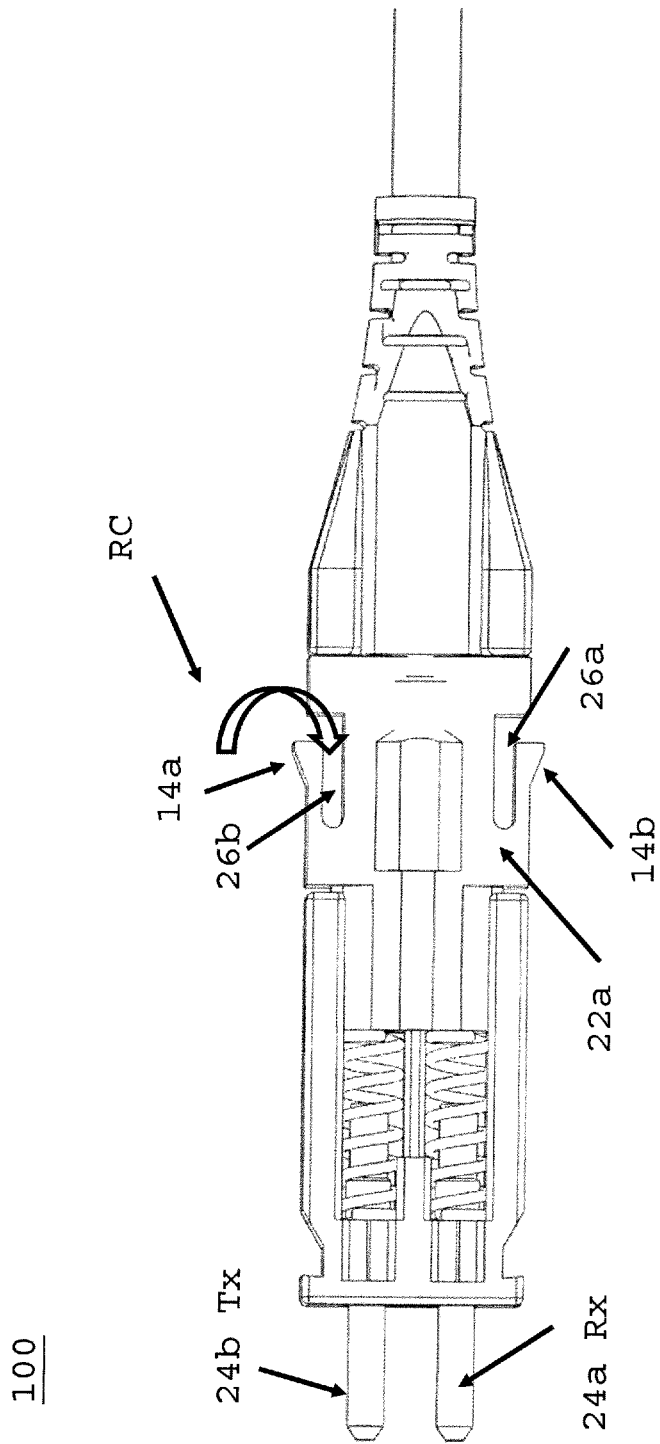
FIG. 5 is FIG. 4 after 180-degree rotation to change connector polarity.

FIG. 4 depicts pushing in direction "PD" on push down on actuator (14a or 14b or 14a and 14b), and as pushed "PD", actuator may rotate "R" inward. Actuator (14a, 14b) is formed as a wing from body portion 22a. As pushed "PD", user removes cable boot assembly 22 from connector housing connector in "Remove" direction. Note connector 100 without outer housing is in a first polarity position with Rx (24a) or read signal above Tx (24b) transmit signal. Rotating cable boot assembly 22 180-degrees changes the connector from the first polarity position to a second polarity position, with Rx (24b) and Tx (24a). Cable boot assembly 22 consists of upper body portion 22a from which depressible actuators (14a, 14b) are formed. FIG. 5 depicts upper body portion 22a further comprises an opening (26a, 26b) used to allow depressed actuators (14a, 14b) to be pushed inward and a portion of actuator structure is accepted into cavity (26a, 26b) or opening. Lower body portion 22b of cable boot secures an optical fiber cable. Dotted line C-C' is the center-line or optical axis of connector 100. FIG. 5 depicts a second polarity after connector 100 is rotated 180 degrees clockwise or counterclockwise, resulting Tx (24b) above Rx (24a). Actuators (14a, 14b) are depressed into cavities or openings (26a, 26b) form in upper body portion 22a. FIG. 6 depicts inserting (in the direction of I) connector 700, a second embodiment of connector 100, into a receptacle opening 34. Like connector 100, connector 700 outer housing has alignment key 12 or tab that is accepted in alignment channel 32b, or another alignment channel depending if a port is unused. Cable boot assembly 22 is secured to front body 18 (as shown in FIG. 1 and FIG. 2).

Figure 7:
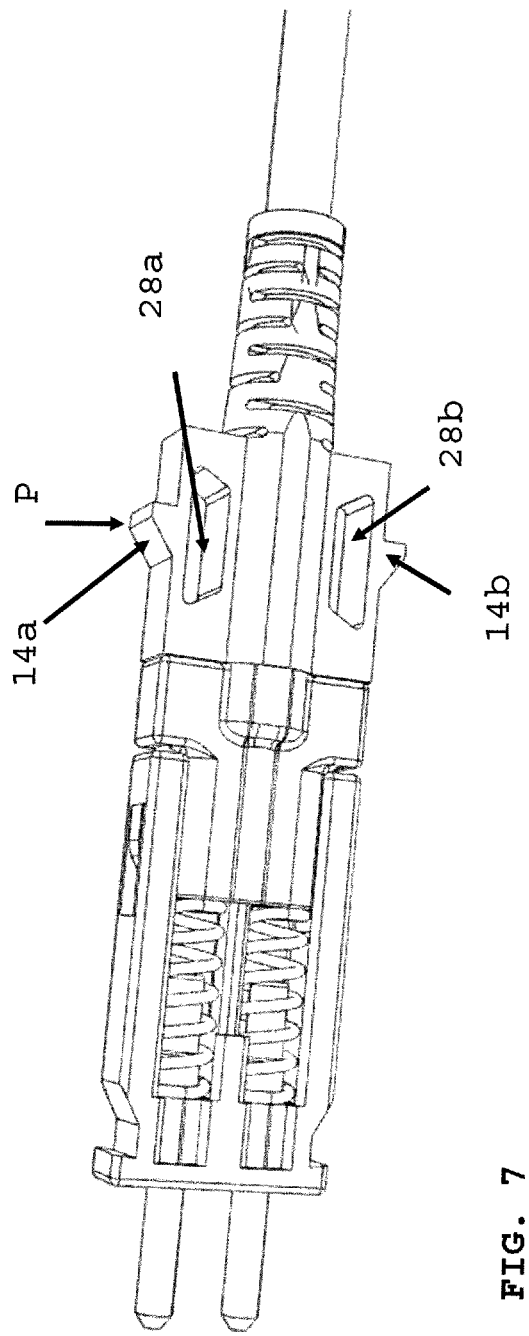
FIG. 7 is another embodiment of actuator of connector of FIG. 1.

FIG. 7 depicts connector 100 with a different actuator. This actuator (14a, 14b) has cavity (or openings) (28a, 28b).

Cavity is formed by material removed from actuator body, so upon depressing actuators (14a, 14b) cavity area collapses (as described in FIG. 10) and connector 700 can be removed from receptacle opening. The actuators for connector 100 or connector 700 are made from a resilient/flexible material that has a memory, or returns to their original form. Actuator (14a, 14b) is formed as a protrusion from upper body portion 22a directly above opening (28a, 28b).

Figure 8:
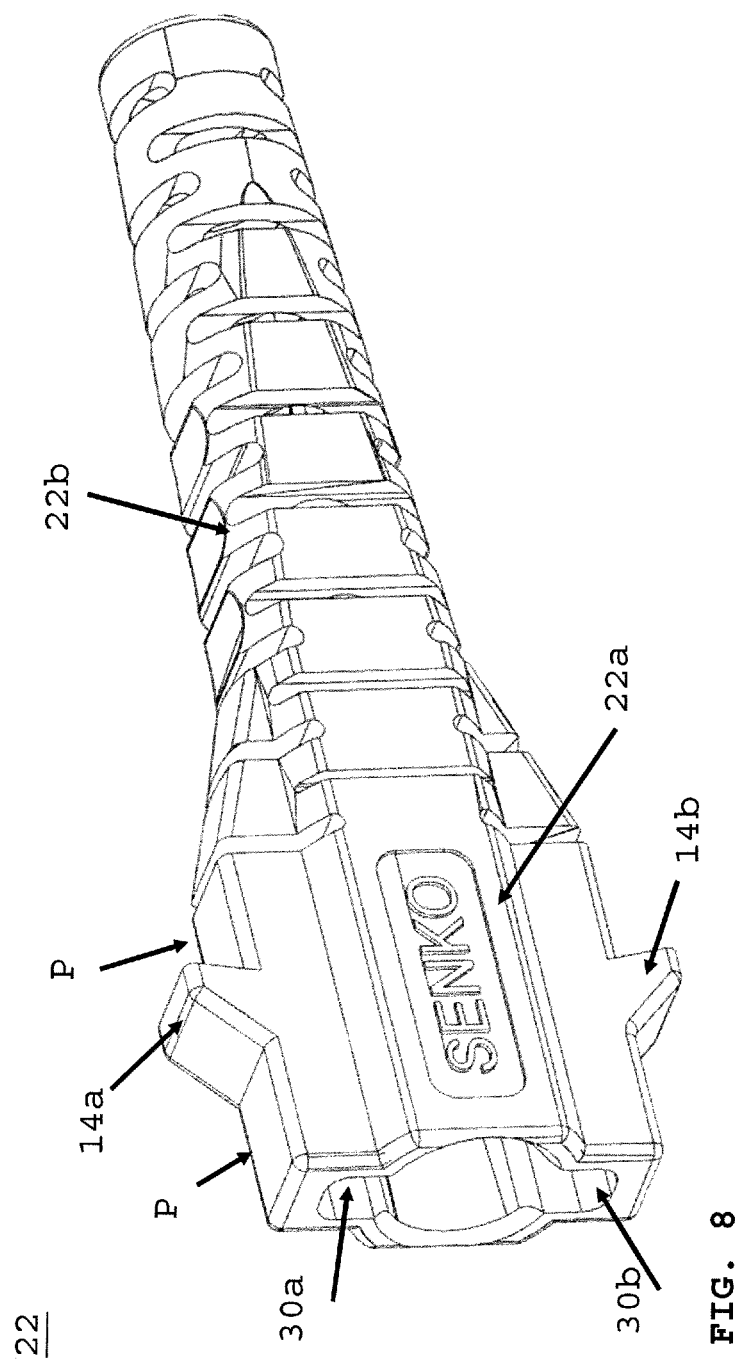
FIG. 8 is a third embodiment of an actuator formed as part of a cable boot assembly.
Figure 9:
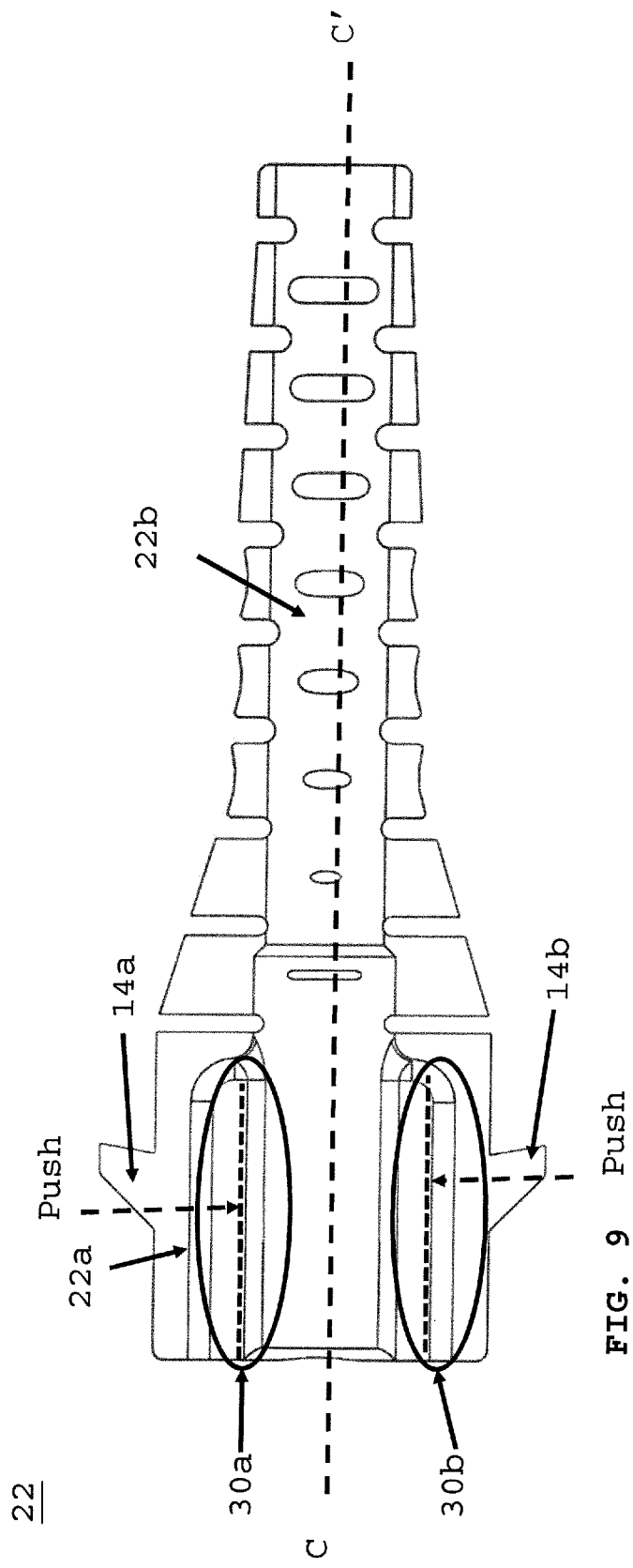
FIG. 9 is a cross-section of FIG. 8 along the optical axis C-C' of the connector.

FIG. 8 depicts a third embodiment of actuator (14a, 14b). In this embodiment, material is removed from the cable boot upper body portion 22a from a proximal end nearer the ferrules toward a distal end nearer the cable boot 22b. Removed material forms a channel (30a, 30b) that collapses when actuators (14a, 14b) are depressed, in direction of P, as depicted in FIG. 9. When depressed, actuator 14b and its corresponding structure depresses into opening 30b approximately up to boundary compression line or dotted line. The user can depress, as indicated by P, anywhere along the upper body portion near actuator (14a, 14b) to release actuator from connector housing 10, for the purpose of changing polarity.

FIG. 10 and FIG. 11 compare two embodiments of actuators (14a, 14b) formed from upper body portion 22a, where upper body portion 22a has cavity or opening (28a, 28b) or (30a, 30b) to allow actuator to be depressed. FIG. 10 cavity is formed by removing material from upper body portion 22a, and the cavity is substantially directly below actuator (14a, 14b). This allows for a harder plastic upper body portion 22a as defined by durometer of the plastic body. FIG. 11 depicts a channel (30a, 30b) formed in upper body port 22a. With channel structure, depressing is provided for along the upper body portion not just nearer the actuators. This would allow the removal of the cable boot assembly from the connector outer housing or adapter receptacle 34 to affect a change in polarity.

Figure 12:
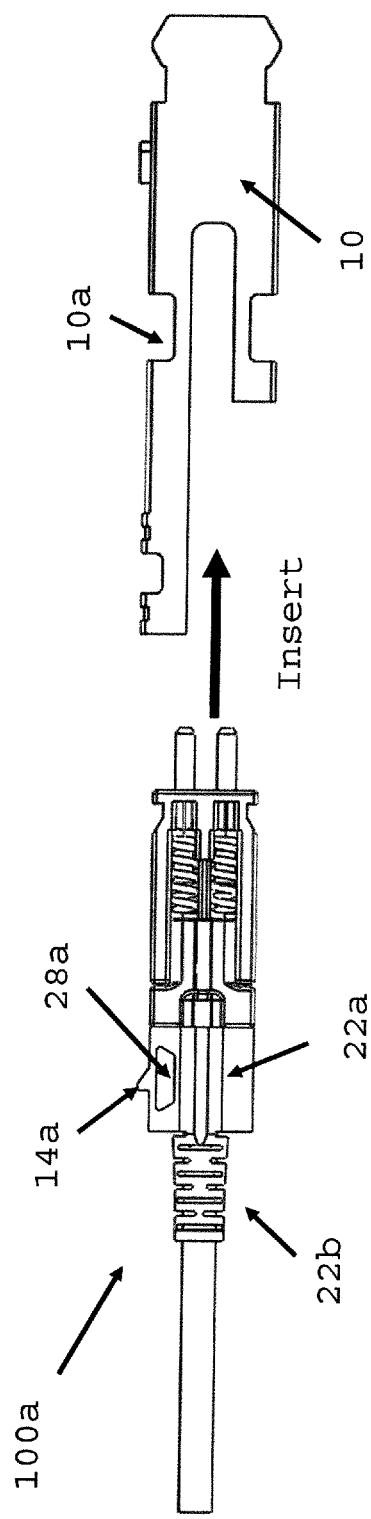
FIG. 12 is an exploded view of connector 100a prior to insert into another receptacle.
Figure 13:
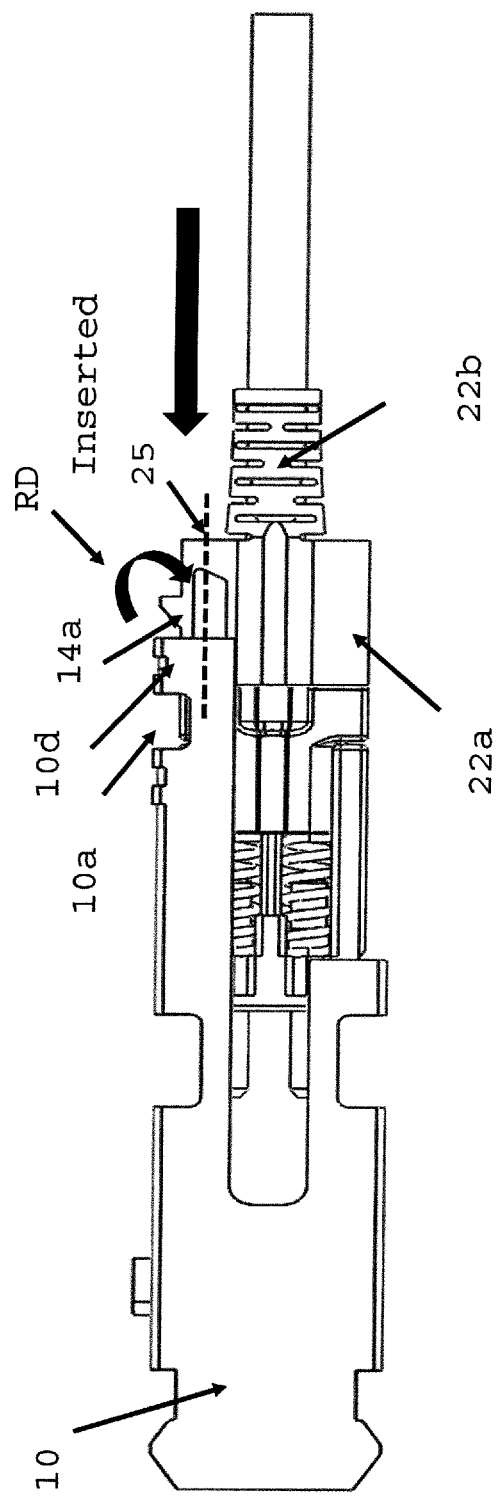
FIG. 13 is a perspective view of connector 100a during insert into the receptacle of FIG. 12 just prior flexible actuator retained in cut-out of connector housing.
Figure 14:
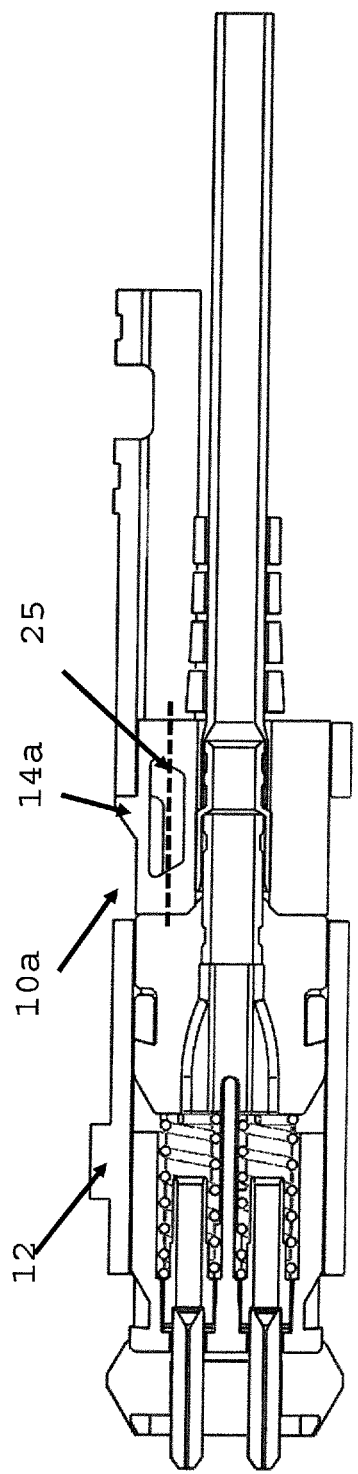
FIG. 14 is a perspective view of connector 100a assembled or secured within receptacle or connector housing.

FIGS. 12-14 depict inserting connector (100, 700) into receptacle 10. FIG. 12 an exploded view of connector 100a and receptacle 10 prior to inserting connector 100a into receptacle 10. Connector 100a differs from connector (100, 700) were connector 100a has a single flexible actuator 14a protruding from upper body portion 22a of cable boot assembly 22. Cable boot assembly 22 comprises an upper body portion 22a, lower body portion 22b, optical cable with cable jacket and one or more optical fibers, crimp ring, and flexible outer boot sheath. FIG. 12 receptacle has cut-out 10a configured to receive flexible actuator 14a, thereby securing connector 100a within receptacle 10 as described in FIG. 14.

FIG. 13 depicts connector 100a partially inserted into receptacle 10. Flexible actuator 14a will flex downward as shown by arrow RD. As actuator 14a is flexible downward cavity 28a collapses toward dashed line. Upon further insert of connector 100a into receptacle 10, receptacle outer housing 10d deforms or collapses actuator 14a, and since actuator 14a is made of a flexible, resilient material such as rubber, upon entering cut-out 10a, actuator 14a returns to its original protruding form, as depicted in FIG. 14. A user would insert connector 100a by grasping at lower body portion 22b and apply a force in a proximal direction toward a front of the receptacle. Compression boundary line 25 indicates an approximate distance or push distance on actuator 14a to push the actuator out of cut-out 10a, so a user pulling or removing the connector 100a distally can release the connector from the receptacle, or to get actuator 4a beneath connector housing during inserting the connector into a receptacle.

FIG. 14 depicts connector 100a fully inserted into receptacle 10. Actuator 14a is protrudes outward as shown in cut-out 10a, and any attempt to remove or release connector 100a by pulling on lower body portion in a distal direction, actuator 14a locks connector 100a in receptacle until a user depresses actuator 14a as shown and described in FIG. 5, FIG. 9 or FIG. 13.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more". Also, like numerals in across the figures retain the same description. For example, 14a, 14b are the actuators in the three embodiment of the cable boot assembly depicted in FIG. 4, FIG. 7 and FIG. 8.

The invention claimed is:

1. A fiber optic connector configured to terminate a fiber optic cable, comprising:
 an outer connector housing comprising a wall defining a cut-out;
 a cable boot assembly configured to be received in the outer connector housing, the cable boot assembly having a longitudinal axis and comprising a cable boot member movable relative to the outer housing, the cable boot member including a housing connection portion configured to connect the cable boot assembly to the outer connector housing, the housing connection portion comprising a flexible actuator received in the cut-out and thereby latching the cable boot assembly to the outer connector housing, the cable boot assembly further comprising at least first and second optical fibers, the first and second optical fibers being secured to the cable boot member for movement with the cable boot member relative to the outer connector housing;
 wherein the at least one flexible actuator is configured to be depressed inward and out of the cut-out to disconnect the cable boot assembly from the outer housing;
 wherein a cavity is formed in the cable boot member for accepting a portion of the flexible actuator in the cavity;
 wherein the fiber optic connector is configured to be selectively plugged into and removed from a receptacle as a unit when the flexible actuator is received in the cut-out and wherein depressing the at least one actuator while the fiber optic connector is plugged into the receptacle can release the cable boot assembly from the outer housing without releasing the outer housing from the receptacle such that the cable boot assembly can be withdrawn from the outer housing without withdrawing the outer housing from the receptacle when the cable boot assembly is pulled in a distal direction; and
 wherein after the cable boot assembly is withdrawn from the outer housing, the cable boot assembly is configured to rotate 180° about the longitudinal axis to an inverted orientation and be reinserted into the outer housing in the inverted orientation to reverse a polarity of the fiber optic connector.

2. The fiber optic connector according to claim 1, wherein the cable boot assembly is secured to a front body, and the front body is secured to the receptacle by the at least one actuator.

3. The fiber optic connector according to claim 2, wherein the actuator is formed as a protrusion on the cable boot member.

4. A method of changing polarity of a fiber optic connector, comprising:
provinding a fiber optic connector according to claim 1;
depressing one or more actuators formed from an upper body of a cable boot assembly;
removing the cable boot assembly from the connector housing;
rotating the cable boot assembly 180-degrees changing the fiber optic connector from a first polarity to a second polarity; and wherein inserting the cable boot assembly after rotating 180-degrees into the connector housing results in fiber optic connector in the second polarity.

5. A cable boot assembly configured to be received in an outer connector housing to form a fiber optic connector that can be inserted into a fiber optic receptacle as a unit, the cable boot assembly having a longitudinal axis, the cable boot assembly comprising:
a cable boot member configured to be partially received in the outer connector housing, the cable boot member including an upper body portion and a lower body portion; the upper body portion has at least one actuator configured to engage the outer connector housing when the cable boot assembly is received in the outer connector housing to couple the cable boot assembly to the outer connector housing; the upper body portion has at least one opening formed with the upper body portion and underneath the actuator; and
at least first and second optical fibers, the first and second optical fibers being secured to the cable boot member for movement with the cable boot member relative to the outer connector housing;
wherein depressing the at least one actuator moves the actuator inward into the opening; thereby, allowing the cable boot assembly to be removed from the outer connector housing;
wherein when the cable boot assembly is separated from the outer connector housing, the cable boot assembly is configured to rotate 180° about the longitudinal axis to an inverted orientation and be reinserted into the outer connector housing in the inverted orientation to reverse a polarity of the fiber optic connector.

6. The cable boot assembly according to claim 5, wherein the upper body portion is configured to be secured at a proximal end to a distal end of a front body of the outer connector housing, and the at least one actuator is configured to secure the cable boot assembly and front body within the outer connector housing; thereby, forming a fiber optic connector.

7. The cable boot assembly according to claim 6, wherein the front body contains at least two ferrules.

* * * * *